UNITED STATES PATENT OFFICE.

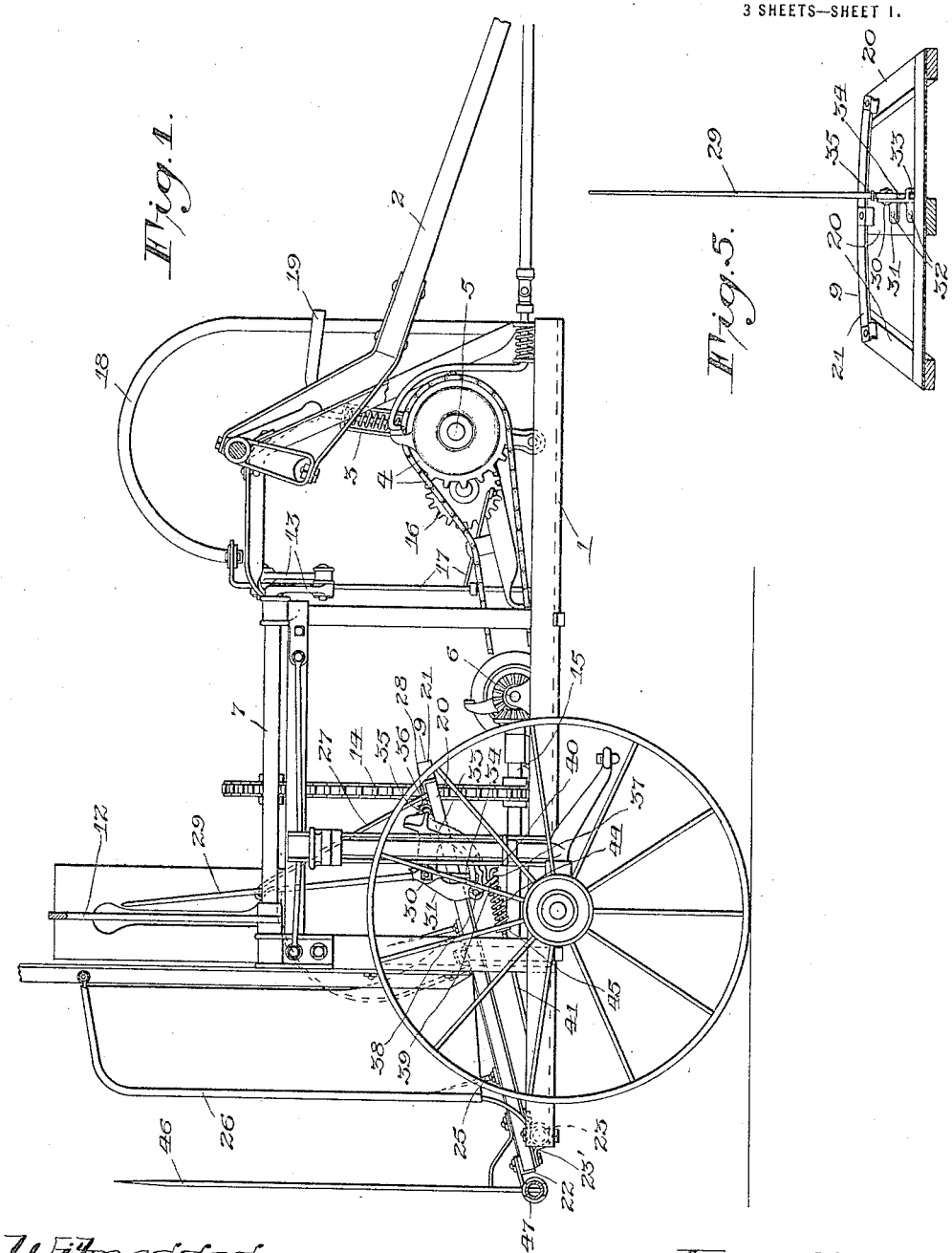

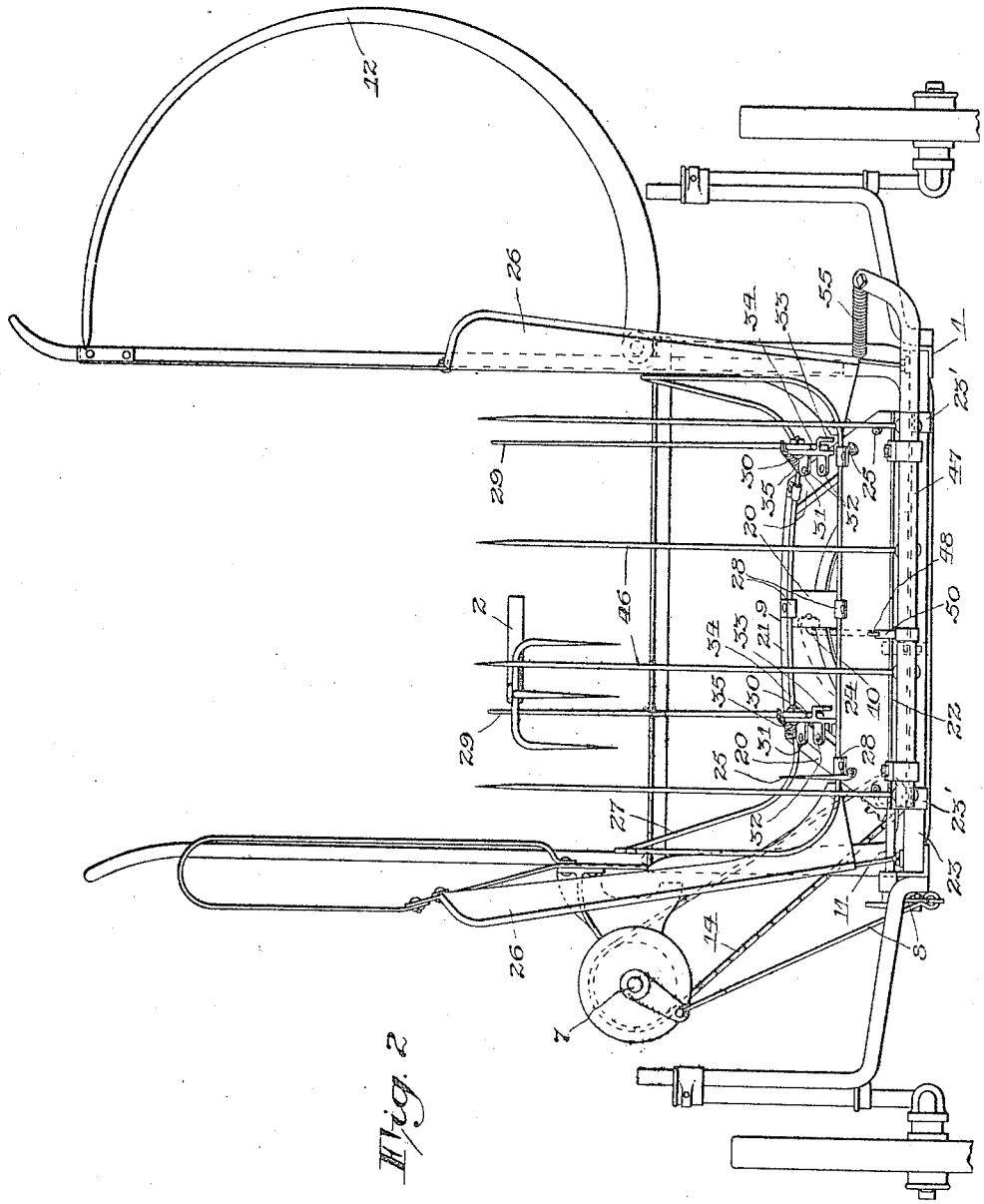

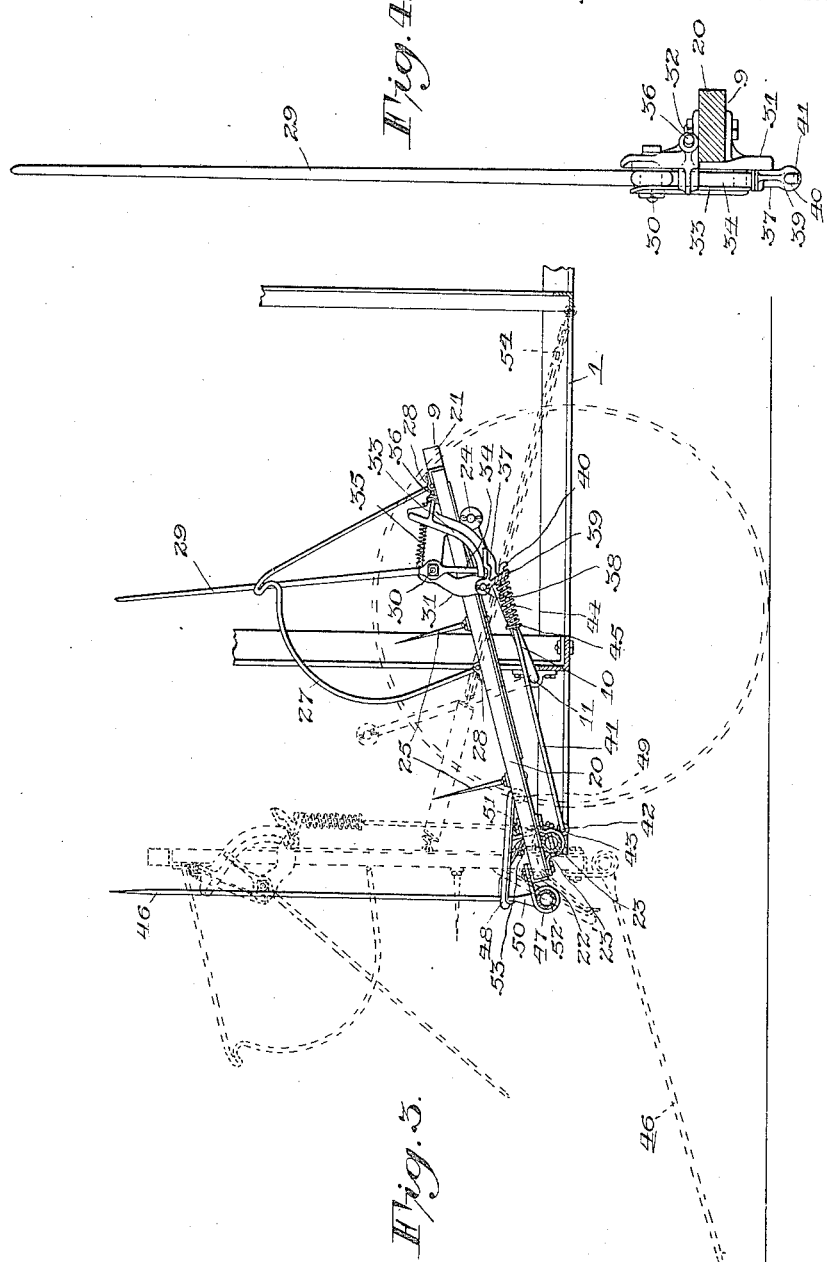

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

GRAIN-SHOCKING MACHINE.

1,226,374.  Specification of Letters Patent.  Patented May 15, 1917.

Application filed November 17, 1913. Serial No. 801,526.

*To all whom it may concern:*

Be it known that I, CLEMMA R. RANEY, a citizen of the United States, residing at Chicago, in the county of Cook and State of Illinois, have invented certain new and useful Improvements in Grain-Shocking Machines, of which the following is a full, clear, and exact specification.

Difficulty has heretofore been experienced in building a shock in a dumping shocker cradle or shock receptacle, and discharging the same therefrom, the sheaves in the cradle tending to shift about therein as the shocker moves over uneven ground, or to shift with respect to the cradle bottom as the latter is tilted in such a manner as to interfere seriously with the standing qualities of the shock. This difficulty has been especially pronounced in handling light or short sheaves, the tendency being for such sheaves to shift in the shocker cradle or shock receptacle in such a manner as to interfere materially with the building of the shock and for the same to shift with respect to each other during the dumping of the cradle in such a manner as similarly to interfere with the setting of the shock.

My invention has for its object to build and set a shock in an improved manner, the several sheaves constituting the shock being securely and compactly positioned while in the shocker cradle in such a manner as to form a compact shock and being held in that desired relation during so much of the dumping operation as to insure that the shock will stand in the field. A further object of my invention is to provide a shocker particularly adapted to operate in short grain, the sheaves being securely held in the desired position in the shocker cradle regardless of their length, in such a manner that all shifting of the same therein, as the shocker moves forward in the field, or relative movement between the upper and lower sheaves as the shock is set, is effectually prevented.

I attain these objects by providing a sheaf receiving and shock discharging member or cradle adapted to be carried upon a shocker frame and coöperate with the other mechanism of the shocker, the said cradle being provided with means positioning the bodies of the sheaves therein, and improved coöperating positioning means engaging the sheaves near their heads, the several positioning means being automatically disengaged from the sheaves as the cradle is turned to its dumping or shock delivering position in order to permit the shock to be readily discharged therefrom.

In the accompanying drawings I have illustrated two embodiments which my invention may assume in practice. It is to be understood, however, that the forms shown herein for purposes of illustration are susceptible of modification without departing from the spirit of my invention.

Figure 1 is a side elevation of a shocker equipped with my improvement, certain details of construction being omitted where they do not specifically relate to this invention;

Fig. 2 is a rear elevation of the construction shown in Fig. 1, the fork driving mechanism being omitted to facilitate clearness of illustration;

Fig. 3 is a side elevation of the rear end of the shocker, showing the cradle in its sheaf receiving and shock discharging positions;

Fig. 4 is a detail view of one of the sheaf holding tines;

Fig. 5 is a detail view of a modified form of sheaf holding tine.

In the construction shown in Figs. 1 to 3 I have illustrated a shocker of the type described and claimed in my copending application, Serial No. 573,106, filed July 21, 1910, which comprises a wheeled frame 1, on which is mounted an oscillating sheaf delivery fork 2 driven alternately back and forth through an arc of substantially 200° to and from the sheaf receiving position shown in Fig. 1 by a suitable resilient pitman connection 3 and chain and sprocket connection 4 on a transverse shaft 5 located at the forward part of the frame and driven from a transverse or main power shaft 6 carried at the middle of the frame 1; a knotter shaft 7 likewise being carried on the upper part of the frame and operatively connected through link and latch connections 8 to a rearwardly dumping shock receptacle or cradle 9 of improved construction, hereinafter described, the cradle being operated by an uptilting dumping arm 10 underlying the cradle and carried on a shaft 11 operatively connected to the link connections 8 in such a manner as to raise the cradle to dumping position when the knotter shaft is rotated to the desired degree. As shown, a binding needle 12 is also operatively connected to the knotter shaft 7 through link connections 13, and this knotter shaft is itself operatively connected through chain and sprocket connections 14 with a supplemental longitudinally extending power shaft 15 driven from the main or transverse power shaft 6. The sheaf delivery member or fork 2 is also shown to be provided with means for deflecting the same laterally as it moves to sheaf delivering position over the cradle 8, these means being shown to comprise gearing 16 operatively connected to the shaft 5, a link connection 17 operatively connected to this gearing, a laterally swinging U-shaped upstanding rod 18 pivoted on the frame and a fork guiding member 19 carried on the fork 2, all substantially as described and claimed in another copending application, Serial No. 742,535, filed January 17, 1913.

The shock receptacle or cradle 9 is shown to comprise a plurality of spaced longitudinally disposed converging base or bottom members 20 united at their front and rear ends by transverse strips 21 and 22, the rear end of the cradle 9 being pivotally connected on the transverse shaft or rod 23 carried at the rear of the frame 1 by bands 23¹ disposed at the opposite ends of the member 22. As in the usual construction, this cradle 9 normally rests in an inclined position upon the bottom of the frame 1, as shown in Fig. 3, against the pivoted cradle actuating arm 10, the latter having a roller 24 on its free end and being operatively connected at its other end to its actuating mechanism 8 heretofore described as driven from the knotter shaft 7. Upon opposite sides of the flat bottom formed by the members 20, 21 and 22 are mounted a plurality of rearwardly diverging series of alined upstanding spikes or tines 25, preferably of such a length that they will pierce the first sheaves deposited in the cradle by the laterally deflected fork 2. The sides of the shock receptacle or cradle 9 extend upwardly on opposite sides of the bottom formed by the members 20, 21 and 22 and are shown to comprise upstanding flat wing members 26 located at the rear of the cradle, preferably extending substantially upward and slightly outward from the bottom members 21 and 22 in such a manner as to form a trough-shaped receptacle to coöperate with bent metallic side members 27 of skeleton construction projecting upwardly and slightly outwardly at the front of the cradle in forming the shock in the cradle. In a preferred form the two side members 27 are integral and formed from a single piece or rod which is attached by suitable means 28 to the flat body portion or bottom of the cradle. As shown, the front arm of each side member is preferably inclined upwardly and outwardly, while the rear arm is substantially vertically disposed. Intermediate these side members 27, and fixed to the side bottom boards 20, are transversely spaced elongated upstanding tines 29 which project upward considerably beyond the tops of the side members 27 and are disposed substantially intermediate the front and rear ends of the cradle bottom as shown in Fig. 3, at a point in front of the needle, so that they do not in any way interfere with the binding of the shock and the delivery of the sheaves to the shock receptacle and yet pierce the heads of sheaves of all lengths, the upper sheaves preferably being pierced at points near their bands. These tines 29 are, as shown herein, preferably pivotally connected to the cradle bottom, as at 30, to transversely spaced brackets 31, fixed at 32 to the cradle bottom and having arc-shaped slotted flanged portions 33, through which extensions 34 on the lower ends of the tines are free to move back and forth; the rear ends of the slots preferably being open to allow free rearward movement of the tines. As shown, these extensions 34 are also protruded at a slight angle to the main portion or shanks of the tines, the latter thereby being slightly inclined rearward in such a manner as to be substantially at right angles to the sheaves to be impaled thereon and delivered thereto by the fork. It is here also to be noted that these extensions 34, and therefore the tines 29, are limited in their movement in one direction by engagement with the end walls of the flanged portions 33. Operatively connected to the tines 29, at a point just above their pivots, are coiled springs 35 fixed at their opposite ends to lugs 36 formed on the bracket members 31 at points beyond the inner ends of the flanged or slotted portions 33. Coöperating with the lower ends of the tines 29 are catches or latches 37 pivoted at 38 to the bracket members 31 at points adjacent the opposite ends of the flanged or slotted portions 33, these latches 37 normally engaging the lower ends of the downwardly extending extensions 34 on the tines 29, as shown in Figs. 1 and 3, and acting to hold those tines in their upright position. As also illustrated in these figures, these latch members are also provided with depending perforated lugs 39, through which extend the hooked inner ends 40 of a substantially U-shaped operating member 41, having converging rearwardly extending arms, and pivotally connected at its rear or bowed portion 42 to a strap 43 fixed to the cradle bottom and movable therewith as the latter moves to and from shock discharging position. Also normally holding the inner ends of this rod 41 in the position shown in Fig. 3, wherein its hooked ends 40 project beyond the openings in the lugs 39, are coiled springs 44 positioned between the rear face of the lugs 39 and suitable stops 45 carried on the arms 41.

Coöperating with the cradle described are a plurality of spaced normally upstanding end tines 46, the same protruding vertically upward at the end of the cradle and forming an end-gate therefor and being fixed at their lower ends to a transverse shaft 47 carried at the rear end of the cradle. As shown, these end tines are normally held in their vertical position by means of a latch member 48 pivoted at 49 to the cradle bottom and engaging a catch 50 fixed to the shaft 47 at a point between its ends. Further, as in the construction set forth in my first application mentioned, these end tines 46 are released as the cradle moves backward to its vertical position by means of suitable latch releasing mechanism comprising a depending curved tail portion 51 on the latch member 48 engaging a lug 52 on the shaft 23 to lift the latch 48 and release the catch 50, a spring 53 interposed between the latch 48 and the cradle bottom acting to return the latch member 48 to its normal latching position after each release thereof. It is also to be understood that the cradle 9 is automatically returned from its dotted line to its full line position by means of any suitable mechanism; such, for instance, as a spring 54, and that the end tines 46 are likewise automatically returned to their full line position by means of any suitable spring 55.

The operation of the construction shown is as follows, when the same is used with a shocker of the construction described: As the sheaf delivery member or fork 2 is oscillated about its pivot on the frame, the sheaves are delivered alternately on opposite sides of the cradle, the first sheaves being impaled upon the short tines 25 and securely positioned thereby at their butts, and also impaled at their heads by the long yielding tines 29; while the sheaves delivered thereafter are positioned above the same and between the sides of the cradle and impaled by the tines 29, the butts of all the sheaves protruding a short distance between the end tines in such a manner as to cause the latter to coöperate in positioning them in the cradle. It is here to be noted that as the sheaves are delivered to the cradle by the sheaf delivery member, the front ends of the same are pierced by the tines 29 at points in front of the shock binding twine and preferably in front of the bundle bands in such a manner that these bundles are securely held together in a compact shock with their heads converging in the manner in which they were placed in the cradle by the fork 2. When the desired number of sheaves has been deposited in the cradle to form a shock, the cradle is dumped rearwardly as a compact whole through the link and latch connection 8 driven from the knotter shaft 7 and connected to the cradle in the manner described in my first mentioned application; the cradle 9 being thrown upward into the dotted line position shown in Fig. 3, or slightly beyond the same, and as it approaches that position, having its end tines 46 automatically released by the latch 48 so that they trail upon the ground and underlie the butts of the sheaves as the shock is set and are drawn out from under the latter as the shocker moves forward. As the shock is thus moved bodily upward and rearwardly with the cradle, the elongated tines 29 holding the sheaves in position are also automatically released by the latches 37 through the action of the members 41 which draw these latch members down. Despite the fact that they are released, however, these tines continue in their function of holding the sheaves, acting throughout the tilting operation in coöperation with the short butt piercing tines to prevent shifting of the sheaves in the cradle, and particularly shifting of the upper sheaves therein. As the shock slips to the ground, however, these tines are depressed into substantially the position shown in dotted lines in Fig. 3 and are then withdrawn from the shock by the forward movement of the shocker in the field without in any way disturbing the standing quality of the shock. Obviously, as soon as they are so withdrawn, since they have already been released from their latches, these tines are then immediately returned to their normal upstanding position with respect to the cradle by the springs 35, their return movement taking place as the cradle itself is returned to its initial or full line position by means of the spring 54, and as the end tines 46 are returned to their initial or upstanding position by the springs 55, the springs 44 acting to re-set the latching mechanism for the tines 29 in advance of their return.

In this construction it is to be noted that in order to hold the sheaves in compact form and prevent shifting of the same, it is unnecessary to provide any means extending over the top of the sheaves which would in any way interfere with the setting of the shock. It is further to be noted that by my improved mechanism the sheaves in the shock are not only securely held in the position in which they were placed in the receptacle by the laterally swinging delivery member while the shock is being built, but are also so held during the tilting of the shock that slipping of the same is effectually prevented. Here attention should also be directed to the fact that due to the disconnection of the head tines during the first stages of the movement of the shock receptacle and the spring returning means therefor, these tines are also always returned to their initial position in the receptacle prior to the return of the latter to sheaf receiving position and the tine that a sheaf may possibly be delivered upon the tines by the sheaf delivery member 2.

In Fig. 5 I have shown a modified form of head tine construction adapted to use when working in long grain, wherein, instead of using a plurality of spaced head tines 29, as shown in Figs. 1, 2 and 3, I use a single tine of the same construction but located centrally in the cradle bottom and adapted to pierce the converging heads of both sheaves in each layer. Obviously, the operation of this tine need not be specifically described, as the tine is constructed in substantially the same manner and operated by the same operating mechanism, the only difference being that instead of a U-shaped operating member 41, a single straight link is used in this instance.

While I have in this application described one form which my invention may assume in practice, it is to be understood that the embodiment shown herein for purposes of illustration may be modified without departing from the spirit of my invention.

What I claim as my invention, and desire to secure by Letters Patent, is:

1. In a shocking machine, a frame, a prostrate dumping shock receptacle thereon, and an upstanding and independently movable tine carried on the bottom of said receptacle and intermediate the ends thereof adapted to engage with the heads of the upper sheaves therein.

2. In a shocking machine, a frame, a dumping shock receptacle thereon, and a normally upstanding tine pivotally mounted in the bottom of said receptacle and movable about its pivot as the receptacle is operated.

3. In a shocking machine, a frame, a dumping shock receptacle thereon, an upstanding head piercing tine pivoted on the bottom of said receptacle, and means for returning said tine to upstanding position after movement thereof about its pivot.

4. In a shocking machine, a frame, a dumping shock receptacle thereon, an upstanding head piercing tine pivoted on the bottom of said receptacle, and resilient means for returning said tine to upstanding position after movement thereof about its pivot.

5. In a shocking machine, a frame, a prostrate dumping shock receptacle thereon, a plurality of transversely spaced upstanding pivotally mounted tines in the bottom of said receptacle and so disposed with respect thereto as to pierce the upper sheaves therein at points adjacent their heads, and yieldable means for normally retaining said tines substantially perpendicular to the bottom of the receptacle.

6. In a shocking machine, a frame, a normally prostrate dumping shock receptacle thereon, means for building up in said receptacle a prostrate shock in which the heads of the sheaves converge, pivotally mounted means located at the front of said receptacle for piercing the upper layers of said converging sheaves at points adjacent their heads, and yieldable means for normally retaining said pivotally mounted means at right angles to the bottom of said receptacle.

7. In a shocking machine, a frame, a normally prostrate dumping shock receptacle thereon, means for building up in said receptacle prostrate layers of sheaves in which the heads of the sheaves converge, pivotally mounted means in said receptacle for preventing movement of the sheaves in the upper layers therein as said receptacle is operated, and yieldable means for normally retaining said pivotally mounted means in a substantially upright position.

8. In a shocking machine, a frame, a normally prostrate dumping shock receptacle thereon, means for building up in said receptacle prostrate layers of sheaves in which the heads of the sheaves converge, sheaf piercing means pivoted in said receptacle for preventing movement of the sheaves in the upper layers therein as said receptacle is operated, and yieldable means normally retaining said piercing means in a substantially upright position.

9. In a shocking machine, a frame, a dumping shock receptacle thereon, an upstanding head piercing tine pivoted in the bottom thereof, and means normally holding said tine in upstanding position, releasing the same as said receptacle is dumped.

10. In a shocking machine, a frame, a dumping shock receptacle mounted thereon, a tine pivoted on the bottom of said receptacle normally projecting upward through the sheaves near their heads, and latching mechanism normally engaging said tine and automatically releasing said tine as the receptacle is dumped.

11. In a shocking machine, a frame, a dumping shock receptacle carried thereon, a pivoted head piercing tine carried in the bottom of said receptacle, and means normally holding said tine in upstanding position operatively connected to the receptacle and releasable to free said tine as said receptacle is dumped.

12. In a shocking machine, a frame, a dumping shock receptacle carried thereon, a head piercing tine pivoted in the bottom of said receptacle, and means operatively connected between said tine and frame normally maintaining said tine in upstanding position and automatically releasing the same when said receptacle is dumped.

13. In a shocking machine, a frame, a dumping shock receptacle carried thereon, an upstanding tine pivoted in the bottom of said receptacle, latching mechanism normally holding said tine in upstanding position, and latch releasing mechanism operatively connected to said frame and releasing said latching mechanism as the receptacle is dumped.

14. In a shocking machine, a frame, a dumping shock receptacle carried thereon, a pivoted tine carried in the bottom of said receptacle near its free end, means normally maintaining said tine in upstanding position releasable when said receptacle is dumped, and means automatically returning said tine to its normal position after the shock is discharged from the receptacle.

15. In a shocking machine, a frame, a normally prostrate dumping shock receptacle thereon, a head piercing member pivoted in the bottom of said receptacle, means normally holding said member in upstanding position, and means for releasing said holding means during the initial stages of the movement of said receptacle.

16. In a shocking machine, a frame, a normally prostrate dumping shock receptacle thereon, a head piercing member pivoted in the bottom of said receptacle, means normally holding said member in upstanding position, means for releasing said holding means during the initial stages of the movement of said receptacle, and means for returning said member to upstanding position promptly upon its disengagement from the shock.

17. In a shocking machine, a frame, a dumping shock receptacle carried thereon, a plurality of elongated transversely spaced tines pivoted to the bottom of said receptacle near the front end thereof, latching mechanism normally holding said tines in upstanding position, and means operated by said receptacle as it moves to dumping position releasing said latching mechanism.

18. In a shocking machine, a frame, a normally prostrate dumping shock receptacle carried thereon, an elongated upstanding head piercing tine mounted in the front end of said receptacle and piercing the upper sheaves therein, and a plurality of shorter upstanding butt piercing tines carried in said receptacle at points in rear of said head piercing tine.

19. In a shocking machine, a frame, a normally prostrate dumping shock receptacle carried thereon, a plurality of transversely spaced upstanding tines mounted in the front end of said receptacle and piercing the heads of the upper layers of sheaves therein, and a plurality of shorter upstanding transversely spaced butt piercing tines carried in said receptacle at points in rear of said first mentioned tines.

20. In a shocking machine, a frame, a dumping shock receptacle pivoted thereon, a plurality of upstanding head piercing tines pivoted in the bottom of said receptacle, means normally holding said tines upright releasable from the same when said receptacle is dumped, and a plurality of upstanding rigid coöperating tines fixed to the bottom of said receptacle and disposed rearwardly of said first mentioned tines.

21. In a shocking machine, a frame, a normally prostrate dumping shock receptacle carried thereon, an end gate disposed transversely with respect to one end of said receptacle, and a normally upstanding pivoted tine carried by said receptacle at a point in front of said end gate piercing the upper sheaves in said receptacle at points adjacent their heads.

22. In a shocking machine, a frame, a dumping shock receptacle pivoted thereon comprising a plurality of spaced end tines pivotally connected to said receptacle and extending across the rear thereof, and a plurality of automatically actuated angularly movable transversely-spaced tines carried on the opposite end of said receptacle and coöperating with said end tines in holding in place the upper layers of sheaves in said receptacle.

23. In a shocking machine, a frame, a normally prostrate dumping shock receptacle thereon, transversely spaced upstanding end tines extending across one end of said receptacle, and an upstanding tine piercing the sheaves in the upper layers in said receptacle pivotally mounted therein at a point in front of said end tines.

24. In a shocking machine, a frame, a normally prostrate dumping shock receptacle thereon, transversely spaced upstanding end tines extending across one end of said receptacle, a normally upstanding pivoted tine carried in said receptacle piercing the heads of the sheaves in the upper layers therein, and a plurality of coöperating shorter tines carried in said receptacle piercing the butts of the bottom sheaves therein.

25. In a shocking machine, a frame, a dumping shock receptacle normally reclining thereon, dumping mechanism therefor, a binding needle carried on said frame and movable across said shock receptacle, and a plurality of normally upstanding transversely-spaced pivoted tines carried on the bottom of said shock receptacle adapted to engage with the upper sheaves therein at points in front of the path of said binding needle.

26. In a shocking machine, a frame, a dumping shock receptacle normally reclining thereon, dumping mechanism therefor, a binding needle carried on said frame and movable across said shock receptacle, a plurality of normally upstanding transversely-spaced tines pivoted in the bottom of said shock receptacle and disposed at points in front of the path of said binding needle, and latching mechanism normally holding said tines in upstanding position automatically releasable as said shock receptacle moves to dumping position.

27. In a shocking machine, a frame, a dumping shock receptacle pivoted thereon, a plurality of upstanding transversely-spaced head piercing tines pivoted on the bottom of said receptacle, latching mechanism carried on the receptacle normally retaining said tines in upstanding position, means actuated upon movement of the receptacle releasing said latching mechanism, and means automatically returning said tines to their normal position after the shock has been discharged from the receptacle.

28. In a shocking machine, a frame, a dumping shock receptacle carried thereon, a tine pivotally mounted on the bottom of said receptacle having an extension below its pivot point, a latch pivoted to the bottom of said receptacle normally engaging said extension, a spring connecting said tine to said receptacle normally tending to hold the same in upstanding position, and spring-pressed means carried by said receptacle and operated as said receptacle is dumped releasing said latching mechanism and automatically returning the same to latching position in the path of said extension as the tine is returned to its upstanding position by said spring.

29. In a shocking machine, a frame, a dumping shock receptacle pivoted thereon, a bracket fixed to the bottom of said receptacle, an upstanding tine pivoted to said bracket near its lower end, a latch pivoted to said bracket normally holding said tine in upstanding position, a spring connecting said tine to said receptacle normally tending to maintain said tine in upstanding position, and a spring-pressed rod intermediate said latch and a fixed portion of said frame movable with said receptacle and releasing said latch as said receptacle is moved to dumping position.

30. In a shocking machine, a frame, a dumping shock receptacle pivoted thereon, a bracket fixed to the bottom of said receptacle, an upstanding tine pivoted to said bracket near its lower end, a latch pivoted to said bracket normally holding said tine in upstanding position, a spring connecting said tine to said receptacle normally tending to maintain said tine in upstanding position, means automatically operated as said receptacle is dumped releasing said tine and means for returning said latching mechanism to tine-engaging position.

31. In a shocking machine, a frame, a dumping shock receptacle normally reclining thereon, a swinging sheaf delivery member pivoted on said frame delivering sheaves prostrate in said receptacle, operating mechanism for said sheaf delivery member deflecting the same laterally as it moves to sheaf delivery position, an upstanding head holding tine pivoted on the bottom of said receptacle, and latching mechanism normally holding said tine upright releasable when said receptacle is dumped.

32. In a shocking machine, a frame, a dumping shock receptacle pivoted thereon, a swinging sheaf delivery member pivoted on said frame, means for oscillating the same about its pivot. means for deflecting the same laterally as it delivers a sheaf to said shock receptacle, a plurality of transversely-spaced upstanding head holding tines pivoted in said receptacle impaling the sheaves so delivered, and means normally holding said tines upright releasing the same as the shock receptacle is moved to dumping position.

33. In a shocking machine, a frame, a dumping shock receptacle pivoted thereon, a plurality of normally upstanding elongated tines pivoted at the front end of the bottom thereof, latching mechanism holding said tines in upstanding position releasable as said shock receptacle is moved to discharging position, and a plurality of shorter rigid tines fixed to the bottom of said receptacle and disposed rearwardly of said elongated tines and in alinement therewith.

34. In a shocking machine, a frame, a dumping shock receptacle carried thereon, a plurality of transversely spaced angularly movable tines pivoted near the front end of the bottom of said cradle normally tending to assume a horizontal position therein of their own weight, latching mechanism holding said tines in upstanding position while said receptacle is in sheaf receiving position, and means automatically returning said tines and latching mechanism to their initial positions after the shock has been discharged.

35. In a shocking machine, a frame, a dumping shock receptacle pivoted thereon, a plurality of transversely spaced upstanding tines carried on the bottom of said receptacle and near the front end thereof, said tines inclining slightly rearwardly and being pivoted to said receptacle at points near their lower ends, and latching mechanism holding said tines in upstanding position operatively connected to said receptacle and actuated thereby as the latter moves to shock discharging position to release said tines.

36. In a shocking machine, a frame, a dumping shock receptacle pivoted thereon, a plurality of upstanding head holding tines pivoted in the bottom of said receptacle, latch mechanism retaining said tines in upstanding position when said cradle is in sheaf receiving position, releasing mechanism for said latch mechanism actuated as said shock receptacle is dumped, and automatic means returning said tines to upstanding position and into engagement with said latch mechanism after the tines have been withdrawn from the shock.

37. In a shocking machine, a frame, a dumping shock receptacle normally reclining thereon, a plurality of transversely spaced upstanding head piercing tines carried at the front end of said receptacle and pivoted to the bottom thereof, a swinging sheaf delivery member pivoted on said frame, means for operating said member to deliver prostrate sheaves upon the tines in said receptacle, latching mechanism normally holding said tines in upright position, means releasing said tines as said receptacle is dumped, and automatic means returning said tines to their upstanding position as the shock is discharged from said receptacle.

38. In a shocking machine, a frame, a dumping shock receptacle pivotally mounted thereon and normally reclining thereon, a binding needle journaled on said frame and movable transversely across said shock receptacle, a plurality of transversely-spaced upstanding tines pivotally mounted at their lower ends on the bottom of said receptacle having their upper ends disposed at points in front of the path of said binding needle, means normally holding said tines in upright position and releasing said tines as said receptacle is dumped, and means for automatically returning said tines to their upstanding position as said receptacle is returned to its normal position on the shocker frame.

39. In a shocking machine, a frame, a dumping shock receptacle normally reclining thereon, a swinging sheaf delivery member pivoted on said frame and movable in an upright plane to build up sheaves into a prostrate shock in said receptacle, operating mechanism for said member whereby the same is deflected laterally as it delivers a sheaf, and an elongated pivoted upstanding head holding tine carried in the bottom of said receptacle intermediate the ends thereof adapted to pierce the upper sheaves of the prostrate shock built by said member.

40. In a shocking machine, a frame, a dumping shock receptacle normally reclining thereon, a swinging sheaf delivery member pivoted on said frame and movable in an upright plane delivering sheaves to said receptacle, operating mechanism therefor deflecting said sheaf delivery member laterally as it delivers a sheaf, a plurality of transversely-spaced upstanding tines pivoted in the bottom of said receptacle near the front end thereof projecting upward through a plurality of layers of sheaves delivered by said sheaf delivery member and holding said sheaves in definite relation with respect to the receptacle, and means whereby said tines may swing rearwardly about their pivots on said receptacle bottom as a shock is dumped by said receptacle.

41. In a shocking machine, a frame, a dumping shock receptacle normally reclining thereon, a swinging sheaf delivery member pivoted on said frame and movable in an upright plane delivering sheaves to said receptacle, means for deflecting said sheaf delivery member laterally as it delivers a sheaf, a plurality of transversely-spaced upstanding tines pivoted in the bottom of said receptacle near the front end thereof projecting upward through a plurality of layers of sheaves delivered by said sheaf delivery member and holding said sheaves in definite relation with respect to the receptacle, tine holding latching mechanism normally holding said tines in upright position, means for releasing the same when said receptacle is dumped, and means for returning the tines to normal position after the shock has been discharged.

In testimony whereof I affix my signature, in the presence of two witnesses.

CLEMMA R. RANEY.

Witnesses:
J. H. HANLY,
S. F. STEELTON.

Copies of this patent may be obtained for five cents each, by addressing the "Commissioner of Patents, Washington, D. C."